(12) United States Patent
Hand (10) Patent No.: US 10,294,970 B2
(45) Date of Patent: May 21, 2019

(54) NON-LINEAR SCARF JOINT

(71) Applicant: The Boeing Company, Chicago, IL (US)

(72) Inventor: Michael L. Hand, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 23 days.

(21) Appl. No.: 14/838,542

(22) Filed: Aug. 28, 2015

(65) Prior Publication Data

US 2017/0058927 A1 Mar. 2, 2017

(51) Int. Cl.
F16B 5/00 (2006.01)

(52) U.S. Cl.
CPC .................................. *F16B 5/0008* (2013.01)

(58) Field of Classification Search
CPC .. Y10T 403/65; Y10T 403/655; F16B 5/0008; F16B 11/006; F16B 11/008
See application file for complete search history.

(56) References Cited

U.S. PATENT DOCUMENTS

| | | | | | |
|---|---|---|---|---|---|
| 1,500,569 | A | * | 7/1924 | Barnhill | E01B 11/26 238/241 |
| 2,142,305 | A | * | 1/1939 | Davis | E04B 1/6125 446/108 |
| 2,267,330 | A | * | 12/1941 | Goss | D21J 1/00 144/354 |
| 2,328,051 | A | * | 8/1943 | Bull | E04B 2/7457 403/339 |
| 2,446,018 | A | * | 7/1948 | Miskimen | A41F 11/16 2/321 |
| 2,582,873 | A | * | 1/1952 | Larson | B24B 41/04 403/339 |
| 2,850,310 | A | * | 9/1958 | Combs | E21B 17/00 403/27 |
| 2,881,017 | A | * | 4/1959 | Millar, Jr. | F16B 7/182 108/117 |
| 3,779,658 | A | * | 12/1973 | Caperton | F16B 7/182 403/339 |
| 3,873,223 | A | * | 3/1975 | Caperton | F16B 7/22 403/341 |
| 4,109,350 | A | * | 8/1978 | Acre | B60T 17/08 24/20 EE |
| 4,504,168 | A | * | 3/1985 | Miller | A47B 13/021 131/270 |
| 4,758,024 | A | * | 7/1988 | Kaempen | B29C 53/564 285/319 |
| 5,597,148 | A | * | 1/1997 | Gospodarich | A47C 7/68 248/230.5 |

(Continued)

*Primary Examiner* — Jonathan P Masinick
(74) *Attorney, Agent, or Firm* — Miller, Matthias & Hull LLP (57) ABSTRACT

Apparatus and methods provide for a non-linear scarf joint and a method for joining two components utilizing a non-linear scarf joint. A non-linear scarf joint includes multi-planar surfaces on connection ends of two components being joined to create a structure. Each multi-planar surface includes a first faying surface, a second faying surface, and a transition faying surface joining the first and second faying surfaces. A transition scarf angle associated with the transition faying surface is different than scarf angles associated with the first and second faying surfaces.

20 Claims, 7 Drawing Sheets

(56) References Cited

U.S. PATENT DOCUMENTS

| | | | | |
|---|---|---|---|---|
| 6,006,486 | A * | 12/1999 | Moriau | B27F 1/06 |
| | | | | 52/586.1 |
| 6,124,010 | A * | 9/2000 | Shih | A41D 27/24 |
| | | | | 428/60 |
| 6,804,926 | B1 * | 10/2004 | Eisermann | B27F 1/04 |
| | | | | 52/592.1 |
| 7,484,337 | B2 * | 2/2009 | Hecht | E04F 15/02 |
| | | | | 52/578 |
| 7,731,669 | B2 * | 6/2010 | Mathews | A61M 25/09 |
| | | | | 140/111 |
| 8,609,216 | B2 * | 12/2013 | Zajtai | B29C 45/1657 |
| | | | | 403/265 |

* cited by examiner

NON-LINEAR SCARF JOINT

BACKGROUND

Components are often joined together end-to-end using adhesively bonded joints. Scarf joints are one example of an adhesively bonded joint. Scarf joints provide benefits over lap joints or various other types of adhesively bonded joints due to their increased control of shear peaking. Shear peaking occurs when a load applied to the joint is not uniformly transmitted along the length of the joint. Shear peaking typically occurs at the ends of the joint where the bond terminates. Conventional scarf joints provide angled surfaces at the ends of the components being joined, creating two flat planes that meet at an angle relative to the axis through the components.

The strength of a scarf joint is dependent upon the length-to-thickness ratio (LTR) of the joint. Low LTRs in which the length of the scarf joint is relatively short and the thickness of the components at the scarf joint is relatively thick, provide weak bonds. Conversely, high LTRs in which the length of the scarf joint is relatively long and the thickness of the components at the scarf joint is relatively thin, provide stronger bonds. A problem arises, however, in implementations in which the geometric constraints of the components being joined do not allow for optimum LTRs.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for a non-linear scarf joint and corresponding method for joining two components. According to one aspect, a non-linear scarf joint includes a first component bonding surface and a second component bonding surface. Each component bonding surface includes a first faying surface, a second faying surface, and a transition faying surface joining the first and second faying surfaces. The first faying surface has a first termination end and a first transition end opposite the first termination end. The first termination end joins the outer surface of the structure according to a first scarf angle. Similarly, the second faying surface has a second termination end and a second transition end opposite the second termination end. The second termination end joins the outer surface of the structure according to a second scarf angle. The transition faying surface joins the first transition end of the first faying surface to the second transition end of the second faying surface. The transition faying surface has a transition scarf angle that is different than the first and second scarf angles.

According to another aspect, a method for joining two components is provided. According to the method, a first component bonding surface is provided at a first connection end of the first component. A second component bonding surface is provided at a second connection end of the second component that is configured to abut the first component bonding surface. Each bonding surface has a first faying surface having a first scarf angle, a second faying surface having a second scarf angle, and a transition faying surface joining the first faying surface to the second faying surface and having a transition scarf angle different than the first and second scarf angles. The first component bonding surface is bonded to the second component bonding surface.

According to yet another aspect, a structure is provided. The structure includes a first component having a first component bonding surface, and a second component having a second component bonding surface. The second component bonding surface is abutting and bonded to the first component bonding surface. Each component bonding surface includes a first faying surface, a second faying surface, and a transition faying surface joining the first and second faying surfaces. The first faying surface has a first termination end and a first transition end opposite the first termination end. The first termination end defines a first segment having a LTR of approximately 50:1. Similarly, the second faying surface has a second termination end and a second transition end opposite the second termination end. The second termination end defines a first segment having a LTR of approximately 50:1. The transition faying surface joins the first transition end of the first faying surface to the second transition end of the second faying surface. The transition faying surface defines a transition segment having a LTR that is less than 50:1.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to a non-linear scarf joint and corresponding structure and method for joining two components using a non-linear scarf joint. As discussed above, scarf joints are often used to join two components end-to-end to create a structure with significantly improved strength as compared to a simple butt joint in which the two components are bonded via vertical surfaces on the end of each component, or as compared to a lap joint in which the ends of the two components are overlapped and bonded together. However, scarf joints provide optimal strength when the LTR is relatively high. When geometric constraints prevent a sufficient length to the scarf joint, the resulting joint may not provide adequate strength characteristics given the particular application of the resulting structure.

Whereas each component being joined via a conventional scarf joint has a single planar faying surface to create a flat plane that abuts the other component to create the linear joint, utilizing the concepts and technologies described herein, each of two components being joined have a connection end that has multiple bonding surfaces to create a multi-planar connection surface. Having a multi-planar connection surface and resulting non-linear scarf joint allows for a joint that is shorter in length, or more compact, while maintaining the desired strength characteristics of an optimal conventional scarf joint.

In the following detailed description, references are made to the accompanying drawings that form a part hereof, and which are shown by way of illustration, specific embodiments, or examples. Referring now to the drawings, in which like numerals represent like elements through the several figures, a non-linear scarf joint and method for employing the same according to the various embodiments will be described. It should be understood that the various figures are not drawn to scale. In particular, the thickness of the various components and corresponding joints have been exaggerated to more clearly illustrate the non-linear scarf joint concepts described below.

Figure 1A:
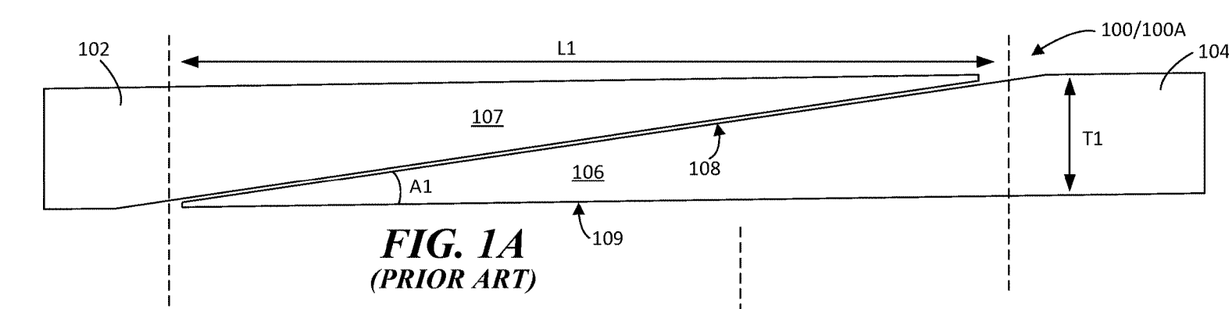
FIG. 1A is a side view of a conventional scarf joint.

FIG. 1A shows a side view of a conventional scarf joint 100. The conventional scarf joint 100 (referred to generically as 100 and the specific conventional scarf joint of FIG. 1A as 100A) will be described for comparison purposes when discussing the non-linear scarf joint described below with respect to FIGS. 1C-4. The conventional scarf joint 100 is used to connect a first component 102 to a second component 104. For clarity purposes, the conventional scarf joint 100 will be discussed in terms of a connection end 106 and a bonding surface 108 of the connection end 106 of the second component 104. It should be appreciated that the first component 102 has a connection end 107 that is shaped to abut the connection end 106 of the second component 104. The connection ends 106 and 107 are designed to abut one another with an applied adhesive (not shown) therebetween to create a structure from the first component 102 and the second component 104 bonded together.

For the purposes of this disclosure, the term "bonded" when discussed with respect to two components or surfaces may be synonymous with "connected" or "attached." Two bonded components or surfaces may be permanently or even removably attached to one another using adhesive, fasteners, or any known means or combination of means for connecting adjacent parts. The specific means for bonding adjacent components or surfaces is not integral to this disclosure.

Returning to FIG. 1A, the conventional scarf joint 100A has a length L1 and a thickness T1. The LTR for this conventional scarf joint 100A may be considered L1/T1. Throughout this disclosure, the various embodiments of the non-linear scarf joints may be described in terms of an associated LTR or a scarf angle. The LTR and the scarf angle are both characteristics that may be used to describe the "steepness" or slope of a surface of a component in all or a portion of the joint. For example, referring to the conventional scarf joint 100 of FIG. 1A, as previously mentioned, the LTR of the entire joint is equivalent to the ratio of the length L1 to the thickness T1. The scarf angle A1 of the conventional scarf joint 100A refers to the angle between the bonding surface 108 (which is planar in a conventional scarf joint) and an outer surface 109.

The LTR and scarf angle A1 are related, so the slope of the bonding surface 108 is a function of the LTR, as well as of the scarf angle A1. The smaller the LTR, the greater the scarf angle A1. In fact, as the LTR approaches zero, the scarf angle A1 approaches 90 degrees, which would be substantially equivalent to a butt joint, which could be considered in a case in which two blocks having all right angles are placed end-to-end. Conversely, as the LTR increases, the scarf angle A1 decreases, which decreases, or flattens, the slope of the bonding surface 108. As previously discussed, the strength of a conventional scarf joint 100 typically increases as the scarf angle A1 decreases or as the LTR increases. For some implementations, and for the purposes of this disclosure, an optimal LTR may be 50:1. In other words, the conventional scarf joint 100A may optimally have a length L1 that is approximately 50 times greater than the thickness T1.

Figure 1B:
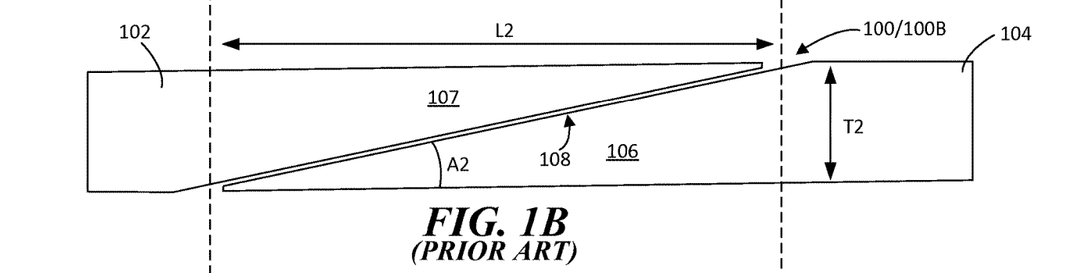
FIG. 1B is a side view of a conventional scarf joint having a greater scarf angle and a shorter length as compared to the conventional scarf joint of FIG. 1A.

FIG. 1B illustrates a problem that arises when using a conventional scarf joint 100 in some applications in which the LTR of the joint is not optimal. FIG. 1B shows a side view of a conventional scarf joint 100B with a shorter length L2 as compared to the conventional scarf joint 100A of FIG. 1A. To assist in visualization, broken vertical lines have been included at the outer edges of the scarf joint to aid in illustrating the difference between the length L1 of FIG. 1A and the shorter length L2 of FIG. 1B. In the example of FIG. 1B, the thickness T2 is equivalent to the thickness T1 of FIG. 1A. With equivalent thicknesses, but with the shorter length L2 of the conventional scarf joint 100B, the LTR of the conventional scarf joint 100B is smaller than the LTR of the conventional scarf joint 100B. Similarly, the scarf angle A2 of the conventional scarf joint 100B is greater than the scarf angle A1 of the conventional scarf joint 100A. Assuming that the LTR and scarf angle A2 of the conventional scarf joint 100B is not adequate for the designed application, and assuming that the geometric constraints of the application for the conventional scarf joint 100B do not allow for an increase in the LTR and decrease in the scarf angle A2, then the conventional scarf joint 100B is not suitable for the intended purpose.

Figure 1C:
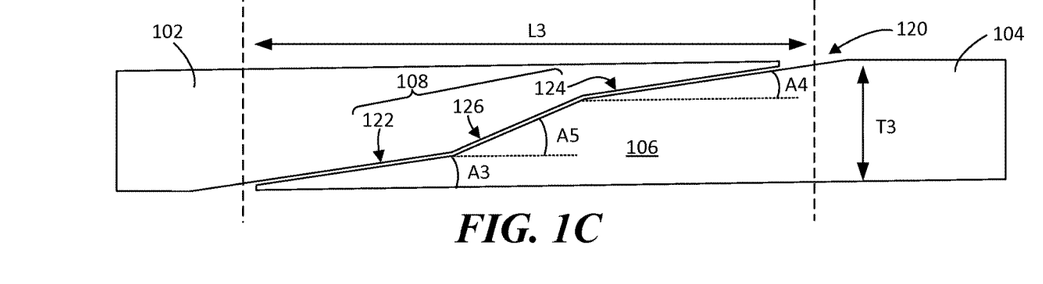
FIG. 1C is a side view of a non-linear scarf joint according to various embodiments described herein.

Accordingly, the disclosure herein provides the non-linear scarf joint 120 of FIG. 1C. The non-linear scarf joint 120 may be used in place of the conventional scarf joint 100B to provide a sufficiently strong joint within the geometric constraints of the application. The non-linear scarf joint 120 has a length L3 and thickness T3 that is equivalent to the length L2 and thickness T2 of the conventional scarf joint 100B of FIG. 1B. However, a significant difference between the non-linear scarf joint 120 of FIG. 1C and the conventional scarf joints 100 of FIGS. 1A and 1B is the bonding surface 108. The conventional scarf joints 100 have a bonding surface 108 that is linear when viewed from the side due to the configuration of the bonding surface 108 as a flat plane. In contrast, the non-linear scarf joints 120 described herein have a bonding surface 108 that is multi-planar or contains multiple curves, being composed of multiple faying surfaces instead of a single surface that creates a flat plane. In the example shown in FIG. 1C, the bonding surface 108 of the non-linear scarf joint 120 includes three faying surfaces 122, 124, and 126.

A first faying surface 122 has a scarf angle A3, a second faying surface 124 has a scarf angle A4, and a transition faying surface 126 between the first and second faying surfaces has a transition scarf angle A5. For the purposes of this disclosure, a "faying surface" may include any surface of a component that abuts a corresponding surface of another component for joining the components together. As will become clear from the various examples discussed below, the faying surfaces disclosed herein may be planar or curved. According to one embodiment, the scarf angles A3 and A4 associated with the first and second faying surfaces 122 and 124, respectively, may be equivalent to one another, while the transition scarf angle A5 is greater than the scarf angles A3 and A4. According to alternative embodiments, the scarf angles A3 and A4 may differ while both being less than the transition scarf angle A5. The scarf angles A3 and A4 may provide for an optimal or suitable LTR associated with that portion of the connection end 106 of the component, such as an approximately 50:1 LTR. Because the transition scarf angle A5 is greater than the scarf angles A3 and A4, the corresponding transition faying surface 126 has a steeper slope, or smaller transition LTR, than the LTRs of the adjacent first and second faying surfaces 122 and 124. In doing so, the overall length L3 of the non-linear scarf joint 120 is shorter than a corresponding conventional scarf joint 100A having a scarf angle A1 that is equivalent to the scarf angles A3 and A4.

Figure 2:
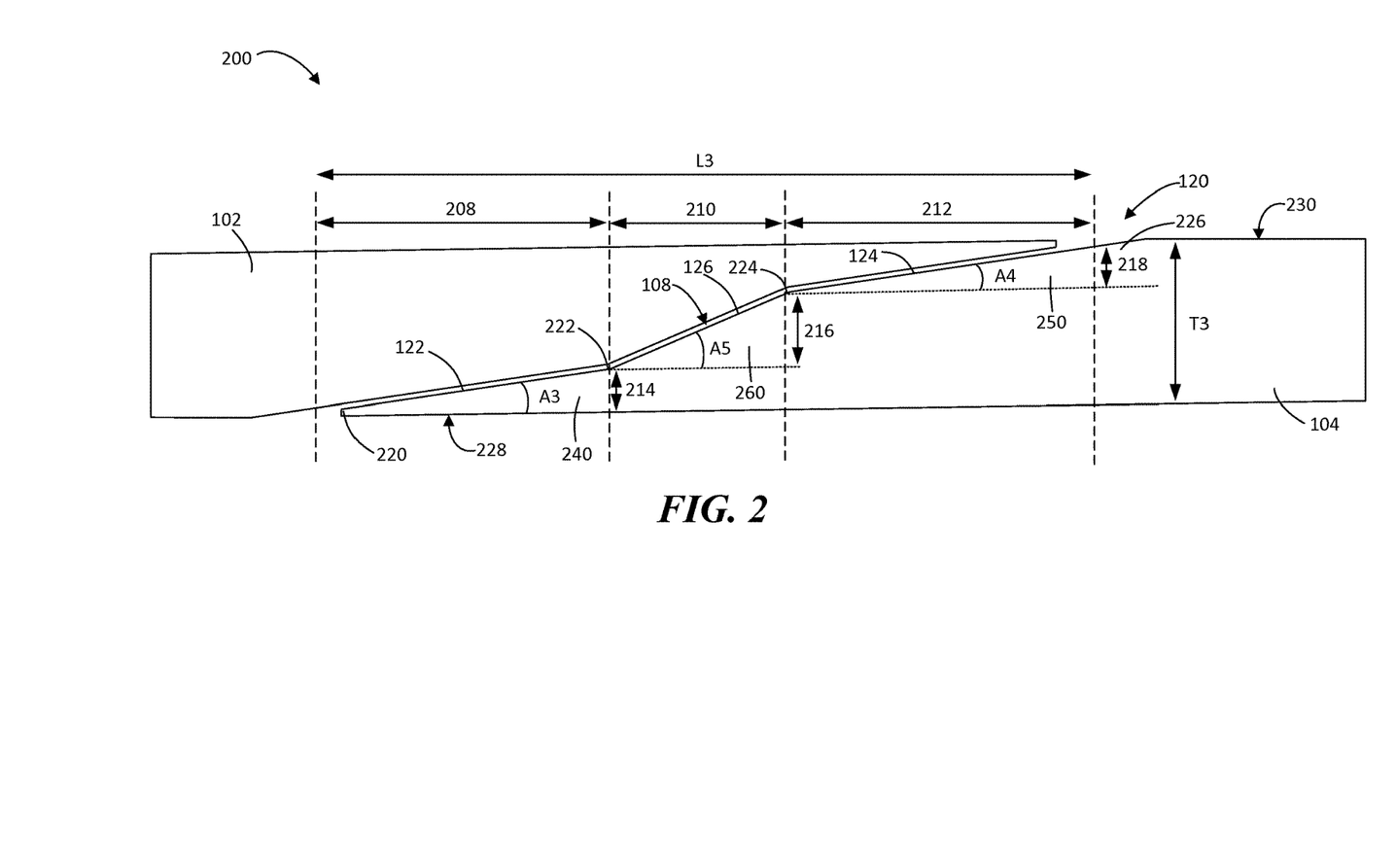
FIG. 2 is a side view of a non-linear scarf joint showing details of various characteristics of the non-linear scarf joint according to various embodiments described herein.

Turning to FIG. 2, further details with respect to a non-linear scarf joint 120 according to various embodiments will be provided. FIG. 2 shows a side view of a structure 200 created by joining a first component 102 to a second component 104 via a non-linear scarf joint 120 according to various embodiments. As described above, the non-linear scarf joint 120 has a bonding surface 108. In this example, the bonding surface 108 includes the first faying surface 122, the second faying surface 124, and the transition faying surface 126 that transitions the scarf joint between the first and second faying surfaces 122 and 124. In this example, the transition faying surface 126 is a planar surface such that the bonding surface 108 includes three approximately flat consecutive planar surfaces. However, as will be discussed below with respect to FIGS. 3A and 3B, the transition faying surface may be curved and/or transition to adjacent faying surfaces via a curved transition having a radius of curvature.

Looking at the non-linear scarf joint 120, the first faying surface 122 begins at a first termination end 220 that transitions from a first outer surface 228 of the structure 200 to the first faying surface 122 according to a first scarf angle A3. Opposite the first termination end 220 is a first transition end 222 that transitions the non-linear scarf joint 120 from the first faying surface 122 to the transition faying surface 126 having a transition scarf angle A5. The non-linear scarf joint 120 again changes slope from the transition faying surface 126 to the second faying surface 124 at the second transition end 224. The second faying surface 124 is angled according to a second scarf angle A4 and joins a second outer surface 230 of the structure 200 at a second termination end 226.

For the purposes of this disclosure, the scarf angles A3-A5 may be considered as measured from horizontal as viewed from the side as shown in FIG. 2, or from a line approximately parallel from the first or second outer surface 228, 230. For example, the first scarf angle A3 is shown as measured from the first outer surface 228 upward to the first faying surface 122. The second scarf angle A4 is shown as measured from an approximately horizontal line (depicted with a broken line) extending from the second transition end 224 upward to the second faying surface 124. The transition scarf angle A5 is shown as measured from an approximately horizontal line (depicted with a broken line) extending from the first transition end 222 upward to the transition faying surface 126.

For the purposes of illustrating various characteristics of a non-linear scarf joint 120 according to the embodiment shown in FIG. 2 in which each faying surface of the non-linear scarf joint 120 is planar, each faying surface may be considered as a hypotenuse of a right triangle as viewed from the side. The corresponding right triangles may each define a segment of the non-linear scarf joint 120. The first segment 240 has a length 208 defined by the horizontal length of the first faying surface 122 between the first termination end 220 and the first transition end, and a thickness 214 defined by the vertical distance between the first outer surface 228 that forms a side of the first segment 240 and the first transition end 222. The corresponding LTR of the first segment 240 is the length 208 to thickness 214 ratio. The first scarf angle A3 may be determined using the LTR of the first segment 240, or vice versa.

The second segment 250 has a length 212 defined by the horizontal length of the second faying surface 124 between the second transition end 224 and the second termination end 226, and a thickness 218 defined by the vertical distance between the second outer surface 230 and the second transition end 224. The corresponding LTR of the second segment 250 is the length 212 to thickness 218 ratio, with an associated second scarf angle A4. It should be appreciated that according to various embodiments, the dimensions of the first segment 240 and the second segment 250 may be substantially similar such that the scarf angles A3 and A4 are the same.

The transition segment 260 has a length 210 defined by the horizontal length of the second faying surface 124 between the first transition end 222 and the second transition end 224, and a thickness 216 defined by the vertical distance between the first transition end 222 and the second transition end 224. The corresponding LTR of the second segment 250 is the length 210 to thickness 216 ratio, with an associated transition scarf angle A5.

Figure 3A:
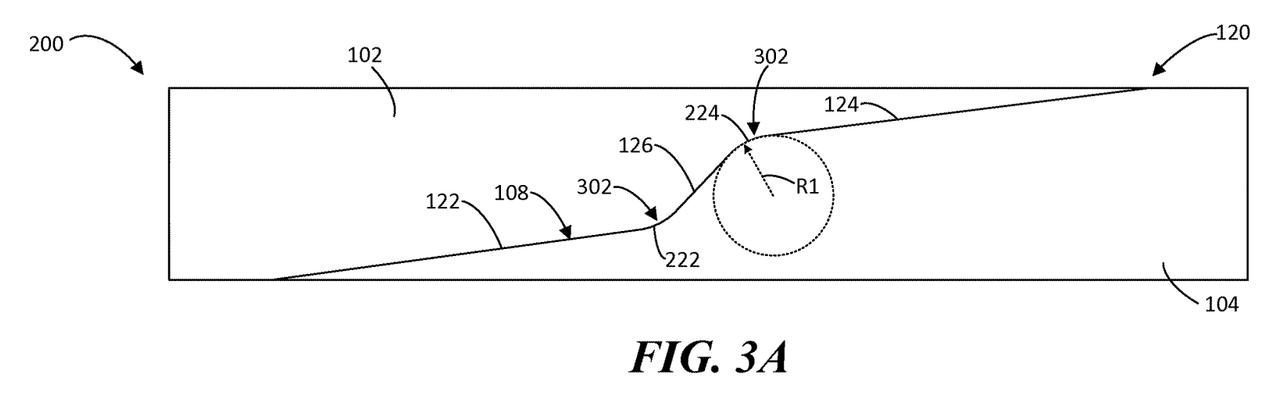
FIG. 3A is a side view of a non-linear scarf joint having curved transition junctions according to various embodiments described herein.

FIG. 3A is a side view of a non-linear scarf joint 120 having curved transition junctions 302 according to various embodiments described herein. Transition junctions are the junctions at which the faying surfaces meet or abut. For example, the first faying surface 122 and the transition faying surface 126 meet or abut at the first transition end 222. Similarly, the transition faying surface 126 and the second faying surface 124 meet or abut at the second transition end 224. In the embodiment shown and described above with respect to FIG. 2, the transition junctions were angled, having two planar surfaces directly abut one another at their respective scarf angles to create an angled junction. According to the embodiments shown in FIGS. 3A and 3B, the transition junctions are curved transition junctions 302. For the purposes of this disclosure, the term "curved" means non-linear when viewed from the side as illustrated in the various drawings. A planar surface will create a linear configuration in the side view, while a non-planar or curved surface will create a non-linear or curved configuration in the side view.

In FIG. 3A, a smooth transition is made between adjacent faying surfaces at the curved transition junctions 302. For example, the first faying surface 122 is planar until a position proximate to the first transition end 222, at which the bonding surface 108 smoothly curves to proper plane of the transition faying surface 126. Similarly, the transition faying surface 126 smoothly curves to the proper plane of the second faying surface 124 at the second transition end 224. The curvature of the curved transition junctions 302 may be defined by a desired radius of curvature R1.

Figure 3B:
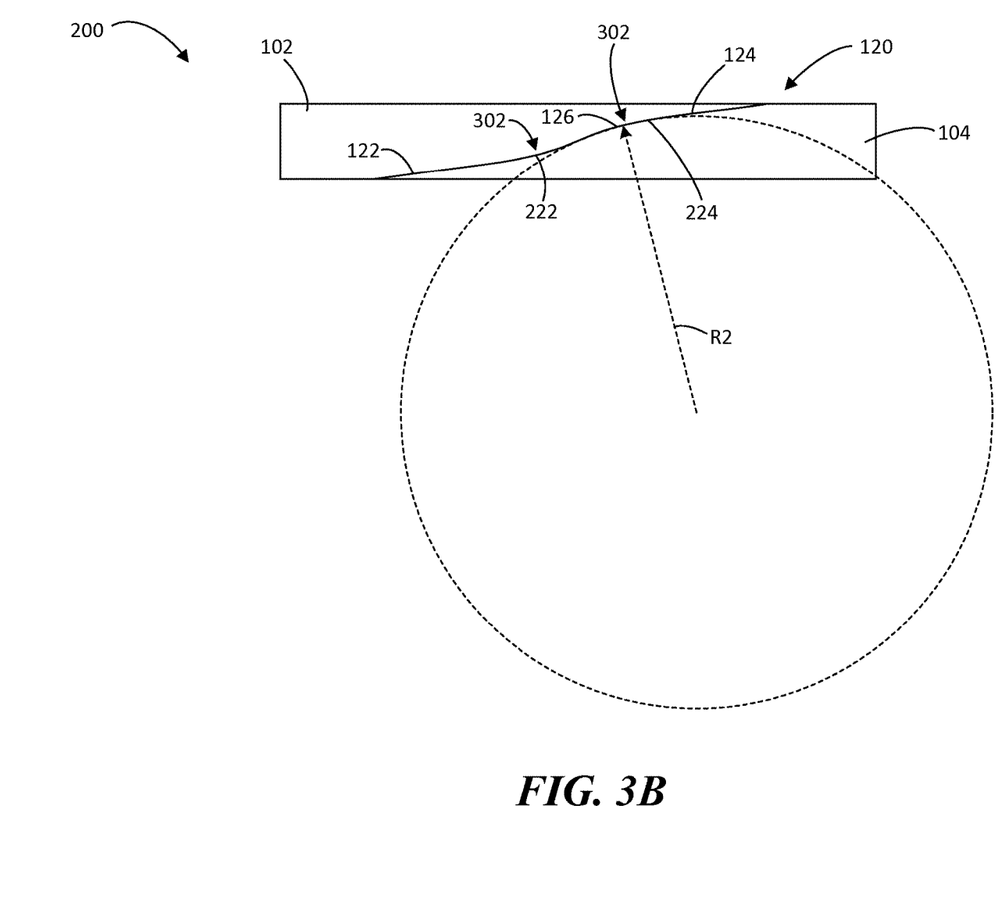
FIG. 3B is a side view of a non-linear scarf joint having a curved transition faying surface according to various embodiments described herein.

FIG. 3B is a side view of a non-linear scarf joint 120 having a curved transition faying surface 310 according to various embodiments described herein. Similar to the non-linear scarf joint 120 of FIG. 3A, the non-linear scarf joint 120 of FIG. 3B has curved transition junctions 302. However, in this example, because of the larger radius of curvature R2 and the geometry of the non-linear scarf joint 120, there are little or no planar characteristics to the transition faying surface 126. Because the transition faying surface 126 transitions directly from the curved transition junction 302 at the first transition end 222 to the curved transition junction 302 at the second transition end 224, the transition faying surface 126 is a curved transition faying surface 310. According to this embodiment, the curved transition faying surface 310 is substantially S-shaped. It should be appreciated that the radius of curvatures R1 and R2 may be exaggerated to illustrate the differences between the corresponding characteristics of the transition faying surfaces 126 of FIGS. 3A and 3B due to the differences in the radii R1 and R2.

Figure 4A:
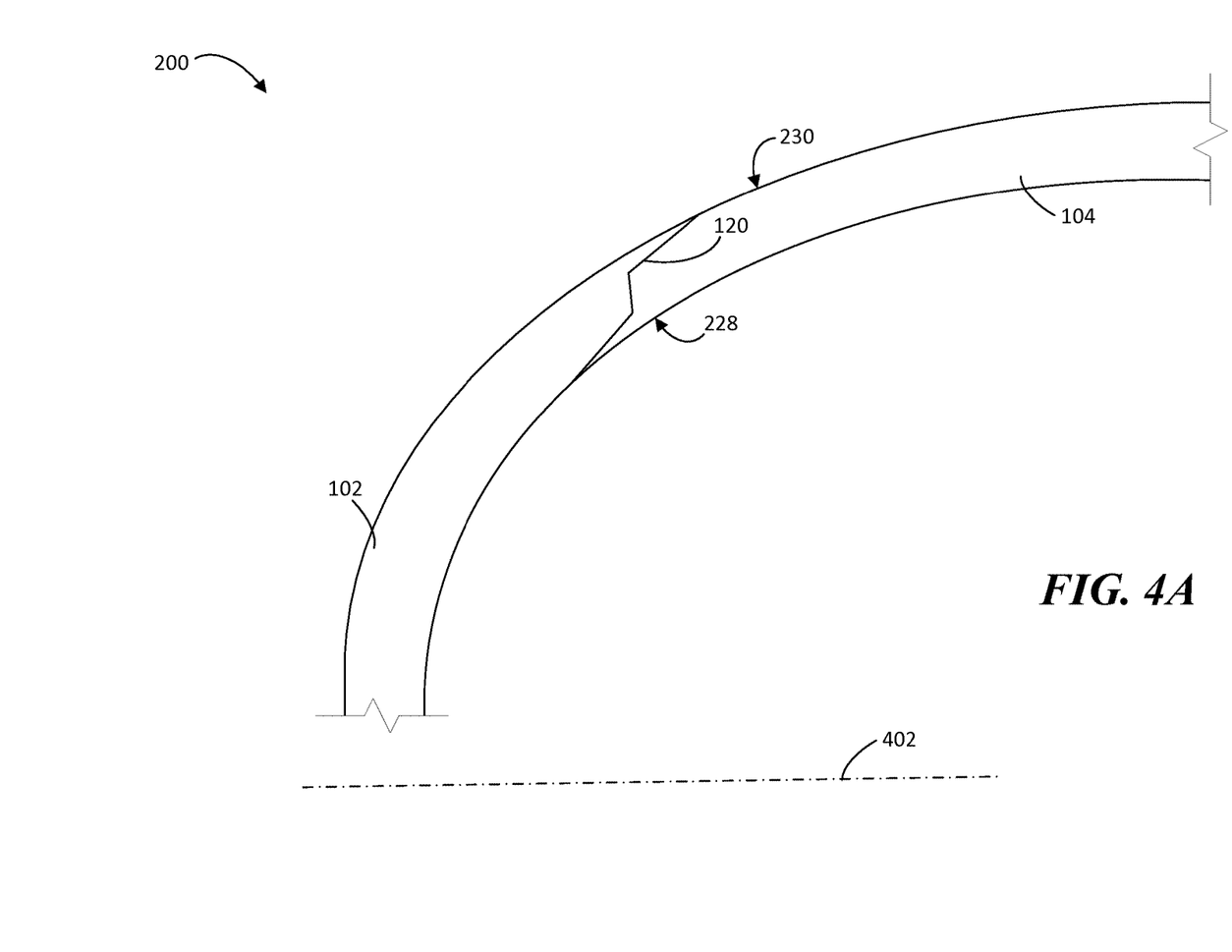
FIG. 4A is a side view of a non-linear scarf joint between curved components according to various embodiments described herein.

FIG. 4A is a side view of a non-linear scarf joint 120 between curved components according to various embodiments described herein. This example illustrates an implementation in which the first component 102 and the second component 104 are both curved components such that the first outer surface 228 of the structure 200 beneath the non-linear scarf joint 120 is curved and the second outer surface 230 of the structure 200 above the non-linear scarf joint 120 is curved. This example may show a portion of a curved shell that revolves around an axis of rotation 402. The various faying surfaces of the non-linear scarf joint 120 are shown as planar surfaces and have been shown with exaggerated scarf angles for clarity purposes. However, turning now to FIG. 4B, an alternative embodiment of a non-linear scarf joint 120 utilized within a similar example implementation within a curved shell will be described.

Figure 4B:
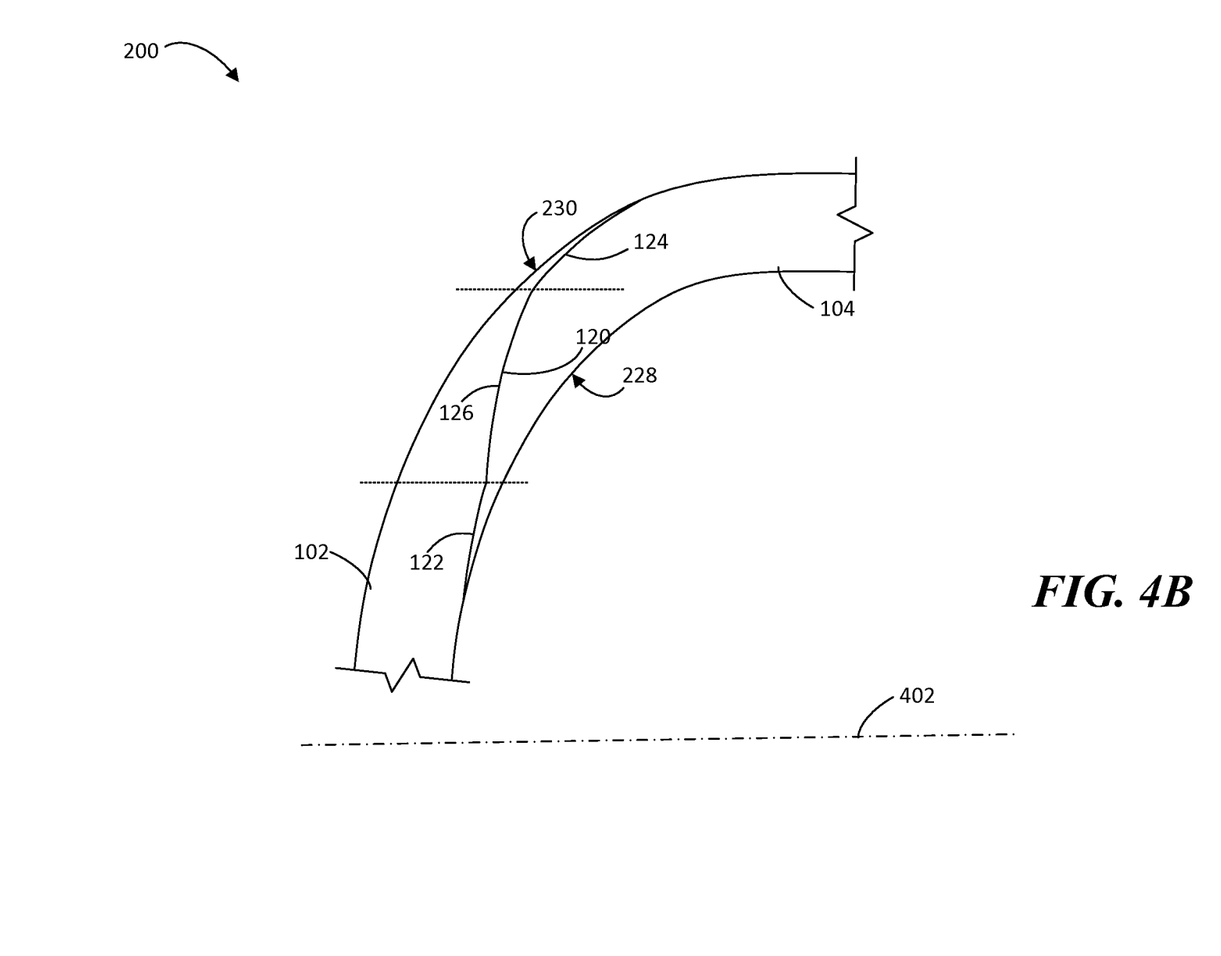
FIG. 4B is a side view of a non-linear scarf joint between curved components according to an alternative embodiment described herein.

FIG. 4B is a side view of a non-linear scarf joint 120 between curved components according to an alternative embodiment. Similar to FIG. 4A, this example may illustrate an implementation of a non-linear scarf joint 120 used to joint sections of a curved shell that will rotate around an axis of rotation 402. As seen in this example, the various faying surfaces 122, 124, 126, each have a curvature that results in a non-linear scarf joint 120 having a compound curvature rather than planar surfaces. The faying surfaces are visually separated by horizontal broken lines for clarity purposes. According to one embodiment, the curvature of the faying surfaces may be determined by dividing the non-linear scarf joint segments that are defined by the faying surfaces into "n" number of segments. The thickness increments corresponding to the segment length increments may then be measured and determined according to the desired scarf angle to determine a corresponding faying surface construction point. A smooth curve may then be drawn through the various faying surface construction points to create the curved faying surface. As an example, a faying surface construction point 30% of the distance along a segment length would be at 30% of the segment thickness according to the desired scarf angle.

Figure 5:
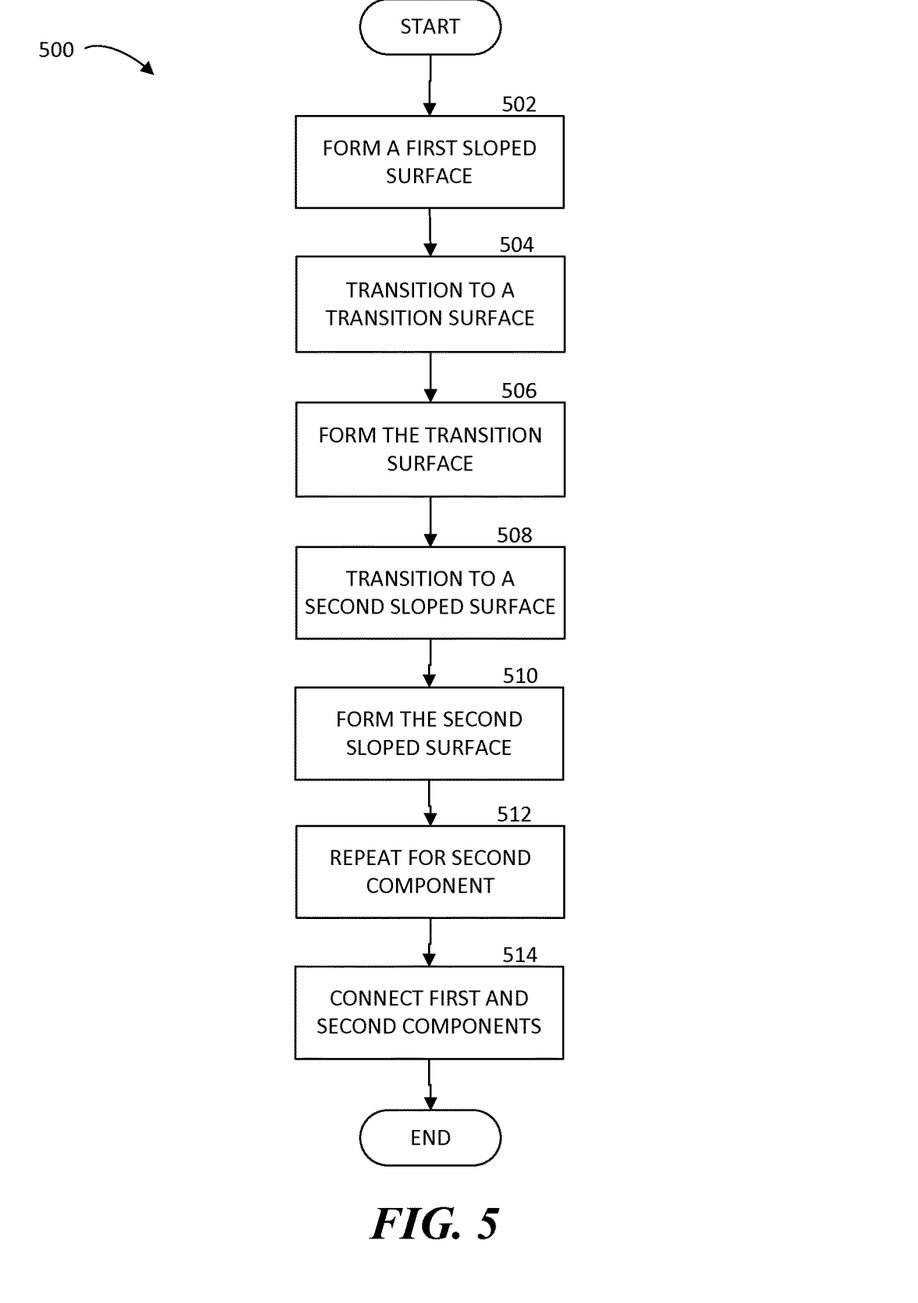
FIG. 5 is a flow diagram showing a method for joining two components according to various embodiments presented herein.

Turning to FIG. 5, a method for joining a first component 102 to a second component 104 according to various embodiments presented herein will be described. It should be appreciated that more or fewer operations may be performed than shown in the figures and described herein. These operations may also be performed in parallel, or in a different order than those described herein. FIG. 5 shows a routine 500 for joining two components using a non-linear scarf joint 120. The routine 500 begins at operation 502, where the first faying surface 122 is formed on the first component 102. The first faying surface 122 is formed at a scarf angle A3 and LTR that will provide for optimal strength for the given application. As discussed above, these optimal scarf angle and LTR characteristics may be equivalent to those of a conventional scarf joint with each component having a single faying surface for bonding if the given application allowed for the necessary length of the scarf joint to achieve the optimal strength characteristics.

From operation 502, the routine 500 continues to operation 504, where the first faying surface 122 is transitioned to the transition faying surface 126. This transition may create an angled transition junction in which the two adjacent planar surfaces abut one another, as shown and discussed above with respect to FIG. 2. Alternatively, this transition may create curved transition junctions 302 in which the adjacent planar surfaces are smoothly transitioned between one another according to a desired radius of curvature, as shown and discussed above with respect to FIGS. 3A and 3B. The routine 500 continues from operation 504 to operation 506, where the transition faying surface 126 is formed. The transition faying surface 126 may be substantially planar, as shown and discussed above with respect to FIG. 2, or may be substantially curved, as shown and discussed above with respect to FIG. 3B.

From operation 506, the routine 500 continues to operation 508, where the transition faying surface 126 is transitioned to the second faying surface 124. Again, this transition may create an angled transition junction or a curved transition junction 302. At operation 510, the second faying surface 124 is formed. The second faying surface 124 is formed at a scarf angle A4 and LTR that will provide for optimal strength for the given application. According to various embodiments, the second faying surface 124 is formed to have an identical scarf angle A4 and LTR as those of the first faying surface 122.

The routine 500 continues from operation 510 to operation 512, where the process is repeated for the second component 104 to create a bonding surface 108 that is configured to abut the bonding surface 108 of the first component 102. At operation 514, the first component 102 and the second component 104 are abutted at the bonding surfaces 108 and connected, and the routine 500 ends. The connection may be made via adhesive, mechanical fasteners, brazing, or a combination thereof.

Based on the foregoing, it should be appreciated that technologies for providing a non-linear scarf joint are provided herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A non-linear scarf joint bonding a first component to a second component to produce a structure, the non-linear scarf joint comprising:
 a first component bonding surface; and
 a second component bonding surface adhesively bonded to and configured to abut the first component bonding surface,
 wherein each of the first component bonding surface and the second component bonding surface comprises:

a first faying surface having a first termination end joining a first outer surface of the structure according to a first scarf angle, and a first transition end opposite the first termination end, a second faying surface having a second termination end joining a second outer surface of the structure according to a second scarf angle, and a second transition end opposite the second termination end, and a transition faying surface joining the first transition end of the first faying surface to the second transition end of the second faying surface and having a transition scarf angle that is different than the first and second scarf angles; and wherein the first faying surface of the first component bonding surface is adhesively bonded to the first faying surface of the second component bonding surface, the second faying surface of the first component bonding surface is adhesively bonded to the second faying surface of the second component bonding surface, and the transition faying surface of the first component bonding surface is adhesively bonded to the transition faying surface of the second component bonding surface.

2. The non-linear scarf joint of claim 1, wherein the first scarf angle and the second scarf angle are equal.

3. The non-linear scarf joint of claim 2, wherein the transition scarf angle is greater than the first scarf angle and the second scarf angle.

4. The non-linear scarf joint of claim 2, wherein the first faying surface and the first scarf angle define a first segment having a first length to thickness ratio (LTR), the second faying surface and the second scarf angle define a second segment having a second LTR, and the transition faying surface and the transition scarf angle define a third segment having a transition LTR different than the first LTR and the second LTR.

5. The non-linear scarf joint of claim 4, wherein the first LTR and the second LTR are each approximately 50:1.

6. The non-linear scarf joint of claim 5, wherein the transition LTR is less than 50:1.

7. The non-linear scarf joint of claim 1, wherein the transition faying surface comprises a planar surface.

8. The non-linear scarf joint of claim 1, wherein the transition faying surface comprises a curved surface.

9. The non-linear scarf joint of claim 1, wherein the first faying surface and the transition faying surface form a first curved transition junction, and wherein the transition faying surface and the second faying surface form a second curved transition junction.

10. The non-linear scarf joint of claim 1, wherein the first component associated with the first component bonding surface and the second component associated with the second component bonding surface are both curved components such that the first outer surface of the structure beneath the non-linear scarf joint is curved and the second outer surface of the structure above the non-linear scarf joint is curved.

11. A method for joining a first component to a second component, the method comprising:

providing a first component bonding surface at a first connection end of the first component;

providing a second component bonding surface at a second connection end of the second component such that the second component bonding surface is configured to abut the first component bonding surface, wherein each of the first component bonding surface and the second component bonding surface comprises a first faying surface having a first scarf angle, a second faying surface having a second scarf angle, and a transition faying surface joining the first faying surface to the second faying surface and having a transition scarf angle different than the first and second scarf angles; and adhesively bonding the first component bonding surface to the second component bonding surface so that the first faying surface of the first component bonding surface is adhesively bonded to the first faying surface of the second component bonding surface, the second faying surface of the first component bonding surface is adhesively bonded to the second faying surface of the second component bonding surface, and the transition faying surface of the first component bonding surface is adhesively bonded to the transition faying surface of the second component bonding surface.

12. The method of claim 11, wherein providing each of the first component bonding surface and the second component bonding surface comprises:

forming the first faying surface such that a first termination end joins a first outer surface of a structure according to the first scarf angle, and a first transition end is opposite the first termination end;

forming the second faying surface such that a second termination end joins a second outer surface of the structure according to the second scarf angle, and a second transition end is opposite the second termination end; and forming the transition faying surface to join the first transition end of the first faying surface to the second transition end of the second faying surface according to the transition scarf angle.

13. The method of claim 12, wherein the first faying surface and the second faying surface are formed such that the first scarf angle and the second scarf angle are equal.

14. The method of claim 13, wherein the first faying surface, the second faying surface, and the transition faying surface are formed such that the transition scarf angle is greater than the first scarf angle and the second scarf angle.

15. The method of claim 13, wherein the first faying surface and the first scarf angle define a first segment having a first length to thickness ratio (LTR), the second faying surface and the second scarf angle define a second segment having a second LTR, and the transition faying surface and the transition scarf angle define a third segment having a transition LTR different than the first LTR and the second LTR.

16. The method of claim 15, wherein the LTR corresponding to the first scarf angle and the second scarf angle is approximately 50:1.

17. The method of claim 16, wherein the LTR corresponding to the transition scarf angle is less than 50:1.

18. The method of claim 12, wherein the transition faying surface is formed as a planar surface.

19. The method of claim 12, wherein the transition faying surface is formed as a curved surface.

20. A structure, comprising:

a first component comprising a first component bonding surface; and a second component comprising a second component bonding surface abutting and adhesively bonded to the first component bonding surface of the first component, each of the first component bonding surface and the second component bonding surface comprising:

a first faying surface having a first termination end joining a first outer surface of the structure and a first transition end opposite the first termination end, the first faying surface defining a first segment having a length to thickness ratio (LTR) of approximately 50:1, a second faying surface having a second termination end joining a second outer surface of the structure and a second transition end opposite the second termination end, the second faying surface defining a second segment having a LTR of approximately 50:1, and a transition faying surface joining the first transition end of the first faying surface to the second transition end of the second faying surface, the transition faying surface defining a transition segment having a LTR that is less than 50:1;

wherein the first faying surface of the first component bonding surface is adhesively bonded to the first faying surface of the second component bonding surface, the second faying surface of the first component bonding surface is adhesively bonded to the second faying surface of the second component bonding surface, and the transition faying surface of the first component bonding surface is adhesively bonded to the transition faying surface of the second component bonding surface.

* * * * *

UNITED STATES PATENT AND TRADEMARK OFFICE
CERTIFICATE OF CORRECTION

| | | |
|---|---|---|
| PATENT NO. | : 10,294,970 B2 | Page 1 of 1 |
| APPLICATION NO. | : 14/838542 | |
| DATED | : May 21, 2019 | |
| INVENTOR(S) | : Michael L. Hand | |

It is certified that error appears in the above-identified patent and that said Letters Patent is hereby corrected as shown below:

In the Specification

On Column 1, Line 2, before the "BACKGROUND" heading, please insert the following paragraph:

-- STATEMENT REGARDING FEDERALLY SPONSORED RESEARCH OR DEVELOPMENT
This invention was made with Government support under HR0011-14-C-005 awarded by Defense Advanced Research Projects Agency. The government has certain rights in this invention. --

Signed and Sealed this
Fifteenth Day of October, 2019

Andrei Iancu
*Director of the United States Patent and Trademark Office*